Feb. 1, 1966

W. W. CHOU 3,233,115

OVERLOAD PROTECTION CIRCUITRY WITH FEEDBACK
INITIATED LATCHING CIRCUIT

Filed Feb. 4, 1964

INVENTOR.
Wayne W. Chou
BY
Blair & Buckles
ATTORNEYS.

United States Patent Office 3,233,115
Patented Feb. 1, 1966

3,233,115
OVERLOAD PROTECTION CIRCUITRY WITH FEEDBACK INITIATED LATCHING CIRCUIT
Wayne W. Chou, % C. M. Laboratories, Box 993, Stamford, Conn.
Filed Feb. 4, 1964, Ser. No. 342,351
11 Claims. (Cl. 307—88.5)

The present invention relates to a condition responsive circuit and, more particularly, to a novel overload protection circuit for safeguarding an electrical power dissipating device.

Although the embodiment of the invention herein disclosed is adapted to protect semi-conductor devices such as transistors from damage due to an overload condition, it will be appreciated that the principles of the invention can be applied with advantage to the protection of any electrical power dissipating device.

Particularly, in the case of transistor circuitry, care must be taken to protect individual transistors from excessive currents due to overload conditions. In output transistors, for example, excessive current conditions arise through improper impedance matching with the output load or from short circuit conditions.

Previous attempts to safeguard transistors from overload damage have resorted to the use of fuses which, in many instances, are not sufficiently rapid in operation to provide positive protection. Other protective measures called for the insertion of limiting impedances in the output lines, which, in many cases, prejudiced the performance characteristics of the transistor circuitry.

It is thus an object of the present invention to provide an overload protection circuit which is capable of the rapid operation required for applications in electronic circuitry.

A further object is to provide an overload protection circuit which is adapted as a safeguard measure to an electrical power dissipating device without prejudice to the latter's performance characteristics.

An additional object is to provide a condition responsive circuit for automatically regulating the power dissipation in an electrical device.

The invention accordingly comprises the features of construction, combination of elements, and arrangement of parts which will be exemplified in the construction hereinafter set forth, and the scope of the invention will be indicated in the claims.

Figure 1:
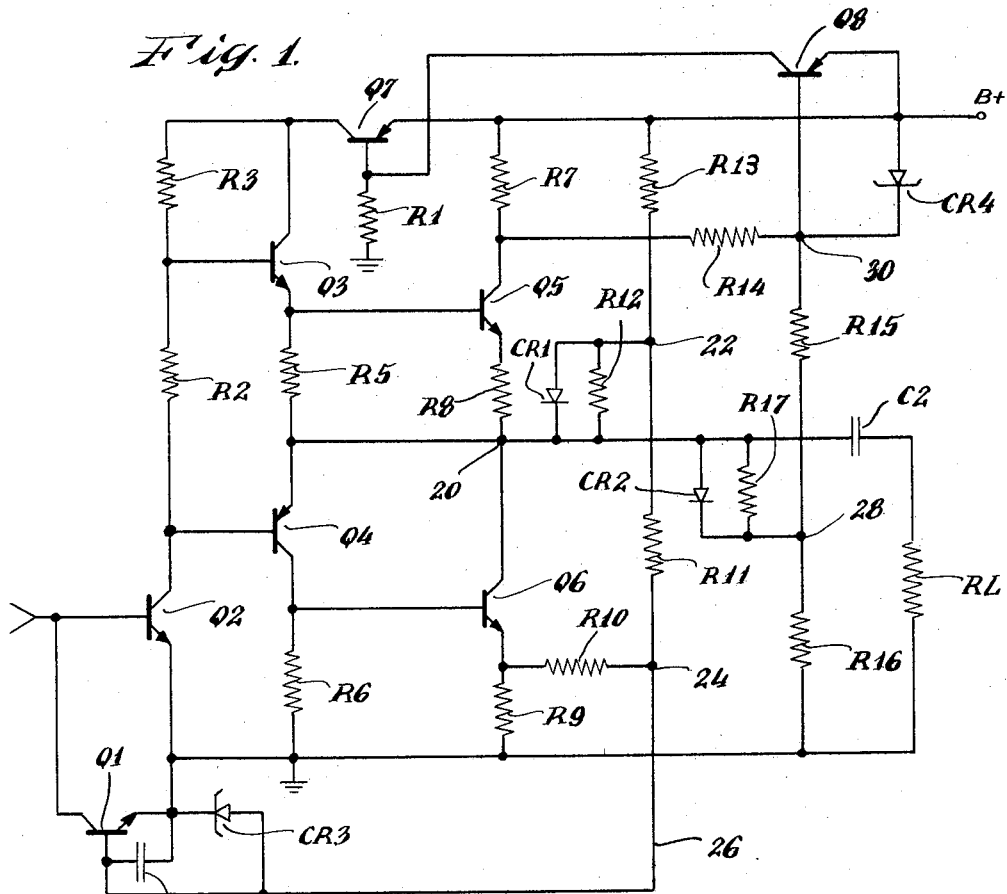
Figure 2:
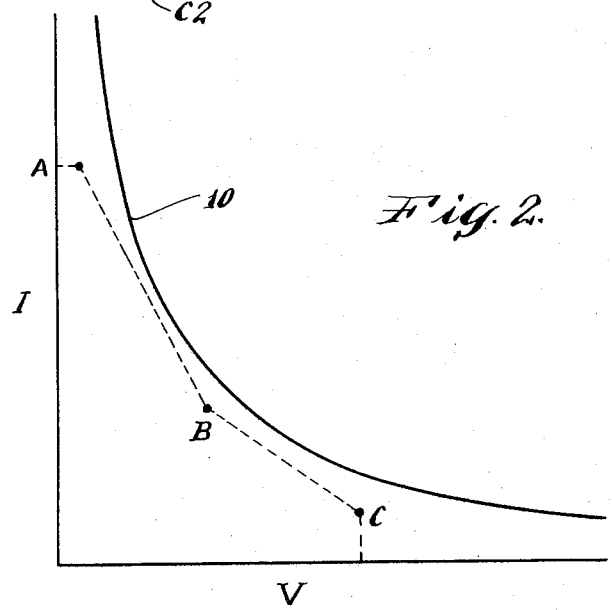

FIGURE 1 is a schematic circuit diagram of the invention incorporated in a conventional transistor amplifier circuit, and FIGURE 2 is a graphical illustration of maximum power dissipation curves for the output transistors of FIGURE 1.

For a general discussion of the invention, reference is had to FIGURE 2 which shows a maximum power dissipation curve 10 as a hyperbolic function. Every point on the curve 10 represents the maximum allowable product of the particular voltage and current, i.e. watts, for the device which is to be safeguarded from overload conditions. Accordingly, the area below the curve 10 of FIGURE 2 corresponds to a safe operating region for the power dissipating device while the region above the curve represents an overload condition.

According to the principles of the invention, impedance elements are connected in circuit with the device so as to monitor the voltage across the device as well as the current through it, and to develop a signal capable of initiating a corrective control function should the monitored voltage and current force the device into the unsafe operating region of FIGURE 2. These impedance elements are appropriately valued so as to approximate the curve 10 such as illustrated by the linear dashed lines connecting points A, B and C. Then, by the same token, the region beneath these dashed lines corresponds to a safe operating region while, above the curve, an overload condition obtains.

Turning to FIGURE 1, a conventional output stage of a transistor amplifier, as also disclosed in The General Electric Transistor Manual, 5th edition 1960, at page 64, is comprised of transistors Q2 through Q6 and their associated circuitry. The output from the previous amplifying stage is applied to the base of transistor Q2 whose collector is connected to B+ through resistors R2, R3 and the collector-emitter circuit of a transistor Q7, while its emitter is tied to ground. The output on the collector circuit of transistor Q2 appearing at the junction between resistors R2 and R3 is applied to the base of transistor Q3 while the base of transistor Q4 is D.C. coupled directly to the collector of transistor Q2. The emitters of transistors Q3 and Q4 are connected together through resistor R5 while the collector of transistor Q3 is connected to B+ through the collector-emitter circuit of transistor Q7 and the collector of transistor Q4 is grounded through resistor R6. Transistors Q3 and Q4 are connected in complementary symmetrical fashion and operate as a driver stage for the push-pull output stage consisting of transistors Q5 and Q6.

Accordingly, the output appearing on the emitter of transistor Q3 is D.C. coupled to the base of transistor Q5 and the output appearing on the emitter of transistor Q4 is D.C. coupled to the base of transistor Q6. This push-pull output stage is energized by B+ being applied through resistor R7 to collector of transistor Q5 while the emitter of transistor Q6 is connected to ground through resistor R9. The emitter of transistor Q5 is connected to the collector of transistor Q6 through a resistor R8. The output signal of this output stage appears at a junction 20 between resistor R8 and the collector of the transistor Q6. Junction 20 is D.C. coupled to the emitter of transistor Q4 to insure symmetrical operation of the driver stage. The output signal at junction 20 is coupled to an output load $R_L$ through a capacitor C2 with the lower side of load $R_L$ connected to ground. By virtue of the disclosed circuit arrangement, the amplified output signal appearing across the load $R_L$ is symmetrical about the voltage level $B+/2$.

According to the invention, the output transistors Q5 and Q6 are individually protected from damage in the event of an overload condition. First considering the overload protection for transistor Q6, a voltage divider comprising resistors R13, R11, R10 and R9 is connected between B+ and ground. The parallel combination of a resistor R12 and a diode CR1 is connected between the junction 20 and a junction 22 between resistors R13 and R11 of the voltage divider. A summing point 24 at the junction between resistors R11 and R11 develops, in response to the sensing of an overload condition, a signal indication which is fed over line 26 to the base of a transistor Q1. The emitter of transistor Q1 is tied to ground and its collector is connected to the base of transistor Q2. A capacitor C3 is connected between the base of transistor Q1 and ground. A tunnel diode CR3 shown connected between the line 26 and ground may be utilized to latch the transistor Q1 in a conducting condition in the event of an overload indication on line 26.

In order to facilitate the discussion of the operation of the invention in safeguarding transistor Q6 from an overload condition, it is given that resistor R10 is very much greater in resistance value than resistor R9. Resistors R11 and R13 are of approximately equal resistance value with each being very much greater than the resistance of resistor R10. Accordingly, the voltage at junction 22 of the potential divider is approximately equal to $B+/2$ volts which may be considered a reference voltage. The voltage at junction 22 is modified by the voltage appearing at junction 20 which corresponds closely to the voltage appearing across the transistor Q6. Where the voltage at junction 20 is greater than the voltage at junction 22, the diode CR1 is back biased and the resulting current through resistor R12 supplements the voltage at junction 22. On the other hand, if the potential at junction 20 is less than the voltage at junction 22, diode CR1 is forward biased and the voltage at junction 22 follows the voltage appearing at junction 20.

The current through the transistor Q6 is continuously monitored by resistor R9 and the resulting voltage developed across resistor R9 is coupled to the summing point 24 through the resistor R10. Considering the graph of FIGURE 2, point A corresponds to the condition where the voltage across the transistor Q6 is at a minimum. Thus, the potential at junction 20 is near ground as is the potential at junction 22 by virtue of the coupling function of diode CR1. For this condition, the value of resistors R9 and R10 are selected such that the voltage across resistor R9 when coupled through resistor R10 to summing point 24 is sufficiently large to forward bias transistor Q1 when transistor Q6 becomes overloaded. With the alternative incorporation of the tunnel diode CR3, the values of resistors R9 and R10 are selected such that the current in line 26 at overload is sufficient to drive the tunnel diode CR3 through its negative resistance region and into its normal diode characteristic region where it will remain to provide sufficient forward bias to turn transistor Q1 on. Capacitor C2 is provided to integrate the signals on line 26 and thus preclude spurious operation of transistor Q1. In either circuit arrangement, with or without diode CR3, with transistor Q1 in full conductance, the base and emitter of transistor Q2 are shorted together driving this transistor to cut-off. The resulting voltage rise at the collector of transistor Q2 decreases the conductance of transistor Q4 and, by the same token, the conductance of transistor Q6. Decreasing the conductance of transistor Q6 necessarily decreases the power being dissipated by this transistor.

Having selected resistance values for resistors R9 and R10 thereby locating point A on the graph of FIGURE 2, point B is then located for the condition where the potentials at junctions 20 and 22 are equal by an appropriate selection of resistance values of R11 and R13. It will be appreciated that the selection of the $B+/2$ voltage at junction 22 is somewhat arbitrary and a slight departure from this value may in fact provide a closer approximation of the curve 10. The voltage, or if diode CR3 is used, the current at summing point 24 sufficient to forward bias transistor Q1 and thereby locate point B is then determined by the reference voltage at junction 22 and the voltage drop across resistor R9.

Point C of FIGURE 2 corresponding to the condition of maximum voltage across transistor Q6 is located by appropriate selection of the resistance value for resistor R12. With this condition, the voltage (or current) at summing point 24 sufficient to forward bias transistor Q1 on overload of transistor Q6 is determined by the reference voltage at junction 22, the current through resistor R12 (diode CR1 back-biased), which in effect supplements the reference voltage, and the voltage drop across R9. It is found that by the progressive location of points A, B and C, in that order, the chosen resistance values of resistors R9 through R13 are compatible for all conditions of overload for transistor Q6 as illustrated in the graph of FIGURE 2.

It will thus be seen that the voltage (or current) at summing point 24 is derived from three sources, to wit, the voltage at junction 20, the reference voltage at junction 22, and the voltage developed across resistor R9. It follows from FIGURE 2 that, with a voltage across transistor Q6 in excess of $B+/2$, the reference voltage at junction 22 will be supplemented by current flow through resistor R12 and less current through resistor R9 will be required to raise the voltage (or current) at summing point 24 to the trip level, i.e. level sufficient to forward bias transistor Q1. On the other hand, with a voltage across transistor Q6 less than $B+/2$, the reference voltage at junction 22 is depressed by virtue of the diode CR1 and larger currents through resistor R9 are necessary to raise the voltage (or current) at the summing point 24 to the trip level.

In more general terms, the voltage at the summing point 24 derived from the three above-noted sources varies according to the electrical power being dissipated by the transistor Q6. Should the power being dissipated exceed the maximum power dissipation curve as approximated by the dash lines joining points A, B and C, the voltage at the summing point 24 will exceed a predetermined "trip" level. It will be appreciated that this straight-line approximation of the curve 10 is occasioned by the use of linear impedance elements to monitor the current through and the voltage across the transistor Q6.

It will be appreciated that although the voltage at the summing point 24 can be made effective in and of itself to drive transistor Q1 into conduction, the inclusion of the diode CR3 is preferred since it insures that the transistor Q1 will be locked into conduction and operation cannot be resumed until the power supply is turned off. Without diode CR3 and with a persistent overload condition, continued maximum current through transistor Q6 would eventually raise the heat sink temperature to values of danger.

Still considering FIGURE 2, the protection of transistor Q5 is effected in a similar manner. Accordingly, a potential divider comprising resistors R7, R14, R15 and R16 is connected between B+ and ground. Following the principles outlined for the protection of transistor Q6, the value of resistor R7 is small compared to resistor R14, while the resistance values of resistors R15 and R16 are approximately equal with each being very much greater than the resistance of resistor R14. The parallel combination of a diode CR2 and a resistor R17 is connected between the junction 20 and a junction 28 between resistor R15 and R16. A summing point 30 at the junction between resistors R14 and R15 develops a voltage which is applied to the base of a transistor Q8. The emitter of transistor Q8 is connected to B+ while its collector is connected to the base of transistor Q7 which is grounded through a resistor R1.

In similar fashion the voltage at junction 28 is by design approximately equal to one-half the supply or B+ voltage. The diode CR2 operates in response to the difference in potentials between junctions 20 and 28 to control in conjunction with the voltage across resistor R7 the voltage level appearing at the summing point 30. Resistor R7 develops a voltage proportional to current through the transistor Q5 for application through resistor R14 to the summing point 30. Thus, with resistors R7 and R14 appropriately valued, point A is located on the graph of FIGURE 2. Points B and C are then located by appropriate selection of values for resistors R15, R16 and R17 in the manner analogous to the selection of values for resistors R11, R12 and R13, previously described.

It will be noted however that the diode CR2, which corresponds in function to the diode CR1, is reversely poled such that the effect of the voltage at junction 28 is to depress the voltage level appearing at summing point 30 in the event of an overload condition. Similarly, a large voltage drop across resistor R7 in response to a large current being drawn through transistor Q5 causes a reduction in the voltage level at summing point 30. As the voltage level at summing point 30 falls below a predetermined "trip" level, the base-emitter junction of transistor Q8 is sufficiently forward biased resulting in increased conduction of this transistor. As a result, the potential at the base of transistor Q7 rises to reduce conduction through this transistor and drop the B+ applied to the driver stage. The voltage at the emitter of transistor Q3 drops thereby reducing the conduction of transistor Q5 and, by the same token, its power dissipation. Assuming a sufficiently large heat sink for transistor Q5, the potential at summing point 30, once equilibrium conditions are reached, can be used to control the conduction of this transistor through the regulating circuit of transistors Q7 and Q8 so as to prevent transistor Q5 from "over-dissipating" in the event of an overload.

In the event the heat sink for transistor Q5 is not sufficiently large, a tunnel diode CR4 connected between the summing point 30 and B+ may be used in the manner of diode CR3 to completely disable the amplifier circuit. As in the case of diode CR3, the diode CR4 is current responsive and the resistance values of resistors R7, R14–R17 would be selected such that the current leaving summing point 30 is sufficient on overload of transistor Q5 to drive diode CR4 through its negative resistance region to its normal diode characteristic regain and thereby forward bias transistor Q8.

The invention thus provides a positive and fast acting protective measure for safeguarding electrical power dissipating devices from damage due to an overload condition. In the disclosed application to transistor circuitry it should be noted that the current monitoring resistors can be located in either the collector circuit, such as the case for transistor Q5 and resistor R7, or the emitter circuit, such as the case for transistor Q6 and resistor R9; the relative currents differing only by the alpha of the particular transistor.

Although in the disclosed application the output transistor Q5 and Q6 are of like polarity types, the invention has application in similar circuitry where the output transistors are of opposite polarity types.

Since the maximum allowable power dissipation curve of any electrical device takes the form of a hyperbolic function, the invention has quite general application. The principles of the invention could be used with advantage in the protection of electrical motors, transformers, and vacuum tubes to name only a few examples. In addition, although in most instances it will suffice to locate only three points on the graph of FIGURE 2, it will be appreciated that the curve 10 can be better approximated by shifting the illustrated locations of points A, B and C or by appropriately locating a greater number of points through the use of additional linear impedance elements and unidirectional coupling elements. A straight-line approximation is preferred through the use of linear impedance elements for the sake of economy, however, non-linear impedance elements may also be used to approximate the requisite hyperbolic function. Moreover, impedance elements such as thermistors may be used to account for the effects of ambient temperature changes on the power dissipating capabilities of the device being protected.

Although the invention is described in connection with its application in overload protection by approximating the maximum power dissipation curve of a device, it will be appreciated that the protection and regulation achieved by the invention could be governed by the approximation of other and different functions.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described the invention, what is claimed as new and desired to secure by Letters Patent is:

1. A condition responsive circuit for safeguarding an output transistors from overload damage, said circiut comprising
   A. a first resistor connected in the output circuit of said transistor for developing a voltage proportional to the current drawn by said transistor,
   B. a potential divider for developing a reference potential,
   C. circuit means continuously electrically coupling the output circuit of said transistor to said potential divider for modifying said reference potential in accordance with the potential difference between said reference potential and the voltage across said transistor, said parallel circuit including,
      (1) a diode and
      (2) a second resistor connected in parallel,
   D. a summing junction connected to said potential divider and said first resistor for adding together the voltage developed by said first resistor and said modified reference potential to develop a signal indicative of an overload operating condition for said transistor.

2. The condition responsive circuit defined in claim 1 which operates to approximate a hyperbolic function corresponding to the maximum allowable power dissipation curve of said transistor, and said diode operates such that
   (a) said first resistor serves in an approximation of a first portion of said hyperbolic function, and
   (b) said first and second resistors, in combination, serve in the approximation of a second portion of said hyperbolic function,
   (c) whereby said overload indicative signal is developed when said transistor operates in a region above the approximated maximum allowable power dissipation curve.

3. The circuit claimed in claim 1 which further includes
   E. means operating in response to said signal for decreasing the conductance of said transistor.

4. The circuit claimed in claim 3 wherein said reference potential is approximately equal to one-half the supply voltage for said transistor.

5. The circuit claimed in claim 4 wherein said operating means includes
   (1) electronic switching means for shunting input signals from said transistor,
   (2) a tunnel diode for maintaining said electronic switching means in a shunting condition in response to said signal and
   (3) a capacitor connected so as to integrate said signal to prevent spurious operation of said electronic switching means.

6. The circuit claimed in claim 4 wherein said operating means includes
   (1) a driver stage supplying signal inputs to said transistor,
   (2) a variable conductance device operating in response to said signal to decrease the supply voltage to said driver stage of said transistor and thereby decrease the conductance of said transistor, and
   (3) a tunnel diode connected between said summing junction and said variable conductance device.

7. A condition responsive circuit for protecting first and second output transistors connected in push-pull fashion, said circuit including
   A. a first current monitoring resistor connected in the output circuit of said first transistor,
   B. a first potential divider including a first junction for developing a first reference potential,
   C. a first parallel circuit connected between said first junction and an output junction between said first and second transistors, said first parallel circuit including
      (1) a first resistor and
      (2) a first diode having
         (a) a cathode connected to said output junction, and
         (b) an anode connected to said first junction,
   D. a first summing point connected to said first potential divider and said first current monitoring resistor for developing a signal indicative of an overload condition for said first transistor, E. a second current monitoring resistor connected in the output circuit of said second transistor, F. a second potential divider including a second junction for developing a second reference potential, G. a second parallel circuit connected between said second junction and said output junction, said second parallel circuit including
   (1) a second resistor and
   (2) a second diode having
      (a) an anode connected to said output junction and
      (b) a cathode connected to said second junction, and H. a second summing point connected to said second potential divider and said second current monitoring resistor for developing a signal indicative of an overload condition for said second transistor.

8. The circuit claimed in claim 7 which further includes

I. first electronic means responsive to an overload signal appearing at said first summing point for reducing the conduction of said first transistor and J. second electronic means responsive to an overload signal developed at said second summing point for reducing the conduction of said second transistor.

9. The circuit defined in claim 8 wherein said first electronic means includes (1) a driver stage for supplying signal inputs to said first and second transistors, and (2) a third transistor for shunting signal inputs from said driver stage.

10. The circuit claimed in claim 9 wherein said second electronic means includes (1) a fourth transistor connected to said second summing point and (2) a fifth transistor controlled by the conductance of said fourth transistor to vary the power supply applied to said driver stage.

11. The circuit claimed in claim 10 wherein each of said first and second electronic means includes a tunnel diode for maintaining each said electronic means in the condition to reduce the conduction of said first and second transistors.

References Cited by the Examiner

UNITED STATES PATENTS

| | | | |
|---|---|---|---|
| 2,751,550 | 6/1956 | Chase | 323—66 |
| 2,769,137 | 10/1956 | Creusere | 323—74 |
| 3,040,238 | 6/1962 | Taddeo | 323—22 |
| 3,100,863 | 8/1963 | McCullough | 323—22 |
| 3,165,649 | 1/1965 | Ault | 307—88.5 |

JOHN W. HUCKERT, *Primary Examiner.*

R. SANDLER, *Assistant Examiner.*